Figure 1:
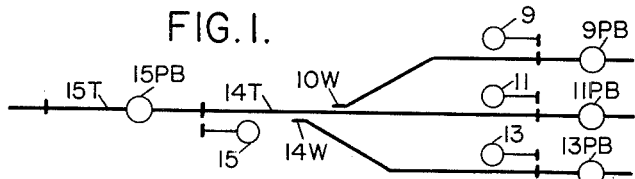

Sept. 18, 1962      W. L. LIVINGSTON      3,054,890

RAILWAY ROUTE CONTROL SYSTEM

Filed May 18, 1959      3 Sheets-Sheet 1

INVENTOR.
W.L. LIVINGSTON
BY
Forest B. Hitchcock
HIS ATTORNEY

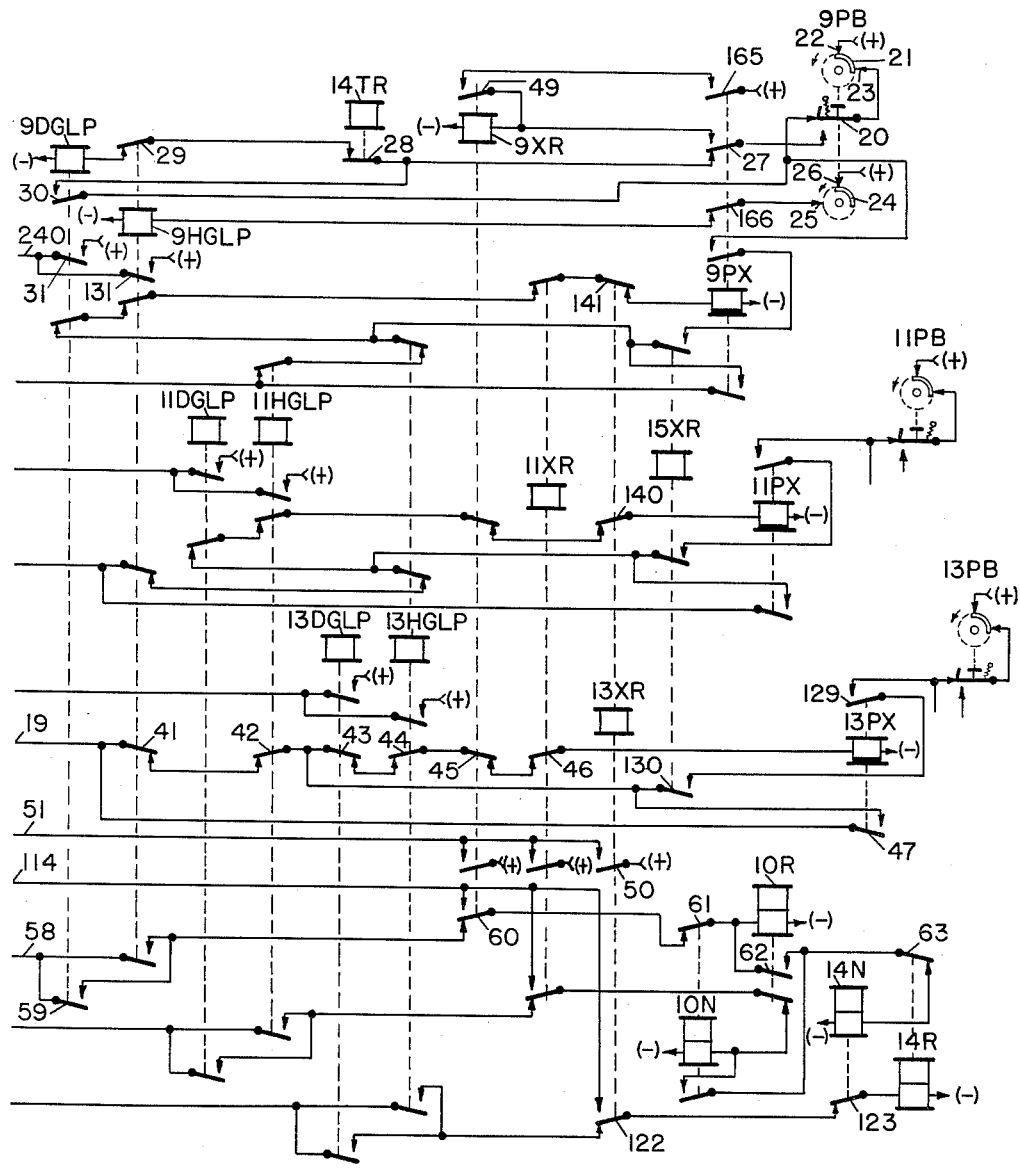

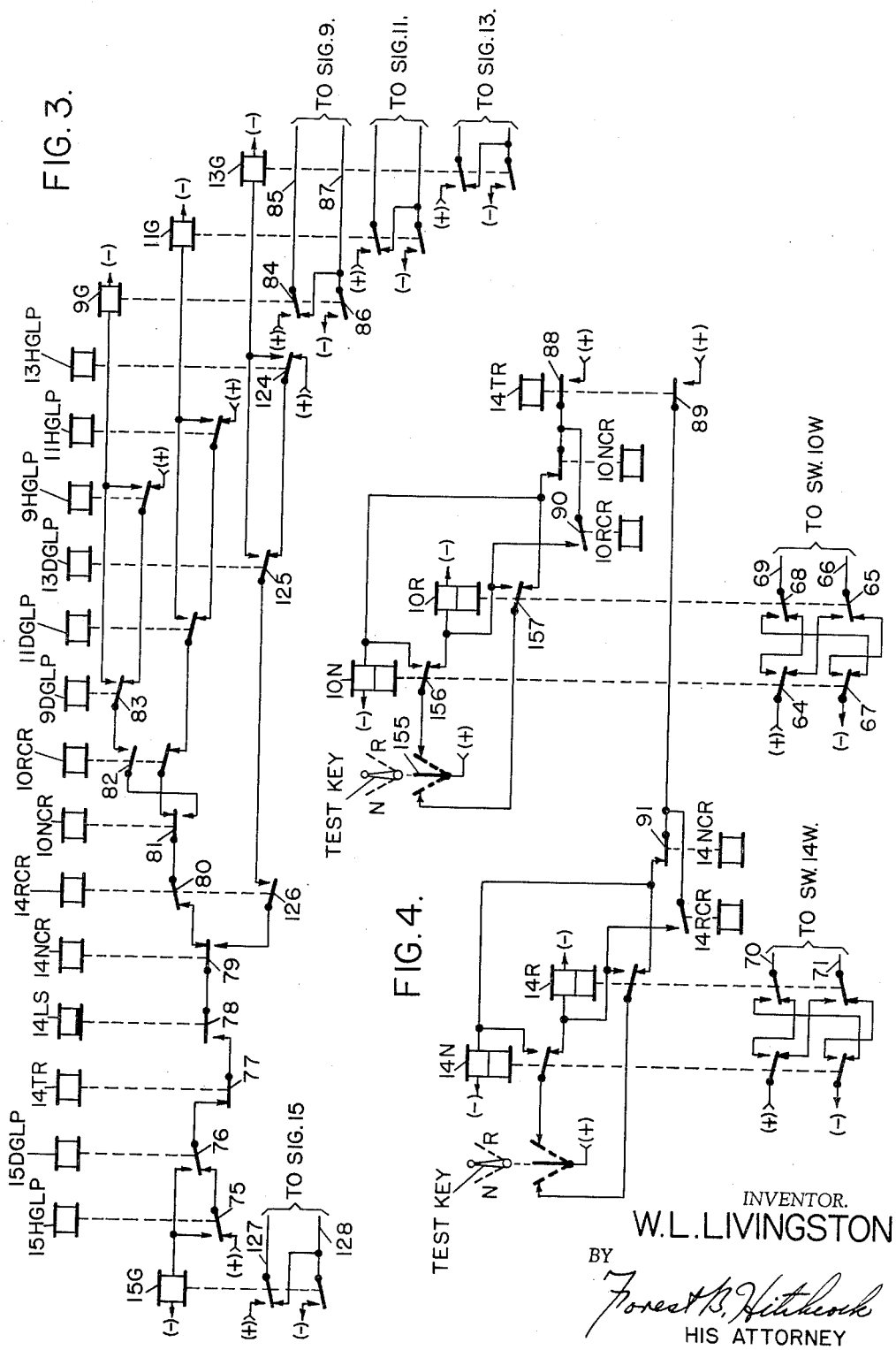

United States Patent Office 3,054,890
Patented Sept. 18, 1962

3,054,890
RAILWAY ROUTE CONTROL SYSTEM
Waltrus L. Livingston, Chili, N.Y., assignor to General Railway Signal Company, Rochester, N.Y.
Filed May 18, 1959, Ser. No. 813,806
11 Claims. (Cl. 246—134)

This invention relates to switch and signal control systems of the entrance-exit type for railroads, and more particularly pertains to improvements in such a system which permit increased flexiblity in operating characteristics.

In an entrance-exit type system, the operator has before him a control panel on which there is a miniature track diagram which represents the actual track layout over which he has control. In the actual track layout, there is a signal located at each of the various possible entrance and exit points of the routes which may be established. These signals, by their indications, control the movement of a train from a designated entrance point to a desired exit point. On the operator's control panel, there is a control button corresponding to each wayside signal, and it is located on the miniature track diagram at a location corresponding to that of the signal which it represents. Ordinarily, there are also movable indicators or line of light indicators on the miniature track diagram which represent the various route-selecting switches, and their operated condition provides a visual indication to the operator as to the actual position of each switch.

In the operation of an entrance-exit type system of this general type, a route may be established from any particular signal location to another merely by depressing first the control button at the desired entrance point of the route and then depressing the control button corresponding to the desired exit point of the route. If a route is available between these two points, all the various switches between the two points will automatically be lined up in the required positions to make this route possible, and as each switch is operated to the called-for position, the corresponding signal associated with that switch is cleared. At the same time, the movable switch indicators on the miniature track diagram are also operated and visual indications are provided as to the clearing of the signals so that the operator can readily ascertain whether the selected route has been properly set up.

In the various prior art switch and signal control systems of this general type, one limitation as to operation has been that any route set up through the system could not involve any switch-back moves. In other words, any pre-established route would involve the operation of any switch in that route to a particular reverse or normal condition and there was no provision for traversing any particular switch first in one position of that switch and then in its opposite position so that a train might, in effect, "double back." In the prior art systems, it was assumed that each train passing through the system would continue its progress in the same direction and would not stop, reverse its direction, and then traverse any switch previously traversed in one position in its opposite position. Such limitations in operation had the effect of reducing considerably the number of available exit points that were available once a particular entrance point had been established. In many types of operation, such a limitation is of no particular consequence, but there have been found to be situations where it is desired that a system has the added flexibility to permit such switchback moves. One particular field of utility of this invention resides in the control of trains in an open-pit mine. To move a train from a higher level to a lower level, for example, such an operation can be most expeditiously carried out by causing the train to make what is, in effect, a plurality of zig-zag moves. Thus, a train may be sent from one level to a lower level in a particular direction, with the train traversing a particular switch in one of its positions as it reaches the lower level. As the train clears this particular switch, the switch may then be operated to the opposite position, thereby providing access to a branching track which leads to a still lower level. When the signal associated with that switch has cleared, the train may reverse its direction, pass that particular switch in its now opposite position, and proceed to the lower level. It is obvious that by a plurality of such zig-zag moves, a train may move from one level to another without moving any considerable distance in a horizontal direction. The system of this invention has been particularly devised so as to permit this type of switchback operation which has heretofore been impossible with the known types of entrance-exit switch and signal control systems.

It should be understood, of course, that the system of this invention is in no sense intended to be limited to that type of use wherein it facilitates operation of trains between different levels. The added facility provided by this invention is equally advantageous where all the various tracks are on the same level since it permits the establishment of routes from any particular entrance point to a greater number of exit points than was heretofore possible.

More specifically, the actuation of a particular control button to designate any given signal location as an entrance point establishes an initiation circuit which has the effect of designating all the various possible exit points to which the train may be routed from that particular entrance point already designated. When this is followed by actuation of one of the control buttons associated with an available exit point, the entire route from the entrance point to the exit point is reversed. If this intended route is one that does not involve any switch-back operations, the entire route can then be set up and locked. Of course, this cannot be done if the intended route comprises a switch which must first be traversed in one of its positions and then in the other. Under these conditions, a first portion or segment of the route is first set up involving the switch involved in the switch-back operation in the first of its required positions. The associated signal is also cleared to indicate that the first route segment can properly be traversed. At the same time, however, the remainder of the route which involves that switch in its opposite position is reserved. When the train has traversed this first portion of the route, the second portion is then immediately and automatically established. When the associated signal has cleared, the train may then reverse its direction and proceed through that particular switch in its opposite condition to the designated exit point.

It is thus an object of this invention to provide an entrance-exit type switch and signal control system for railroads wherein switch-back moves may be made, i.e. moves between designated entrance and exit points which require that the same switch be traversed twice while in respectively different positions.

Another object of this invention is to provide such a switch and signal control system wherein a move between designated entrance and exit points involving a switch-back operation may be reserved in its entirety even though a second portion thereof, involving the switch-back move, cannot be set up and locked until the train has traversed the switch in its first operated position after which the second portion of the route involving that switch in its opposite position can then be set up.

It is another object of this invention to provide a switch and signal control system of this general type wherein both end-to-end moves involving switch-back operations and, alternatively, point-to-point moves between successive signal locations may be made.

It is an additional feature of this invention to provide a switch and signal control system comprising an improved selection network for the control of the switch control relays, whereby a minimum number of windings are required on such switch control relays.

It is still another object of this invention to provide such a switch and signal control system whereby an initiating network for an entire route may be completed even where such contemplated route involved requires traversing a particular track switch twice in respectively different positions, but where there are separate completion networks which are established successively, the first being established to line up a route segment upon the designation of the desired entrance and exit points and the second being automatically completed when the first segment of the route has been traversed by the train with the above-mentioned switch in its first position, the completion network later being made effective to complete the route with the switch in its opposite position.

Other objects, purposes, and characteristic features of this invention will be obvious from the drawings and the accompanying specification.

Figure 2A:
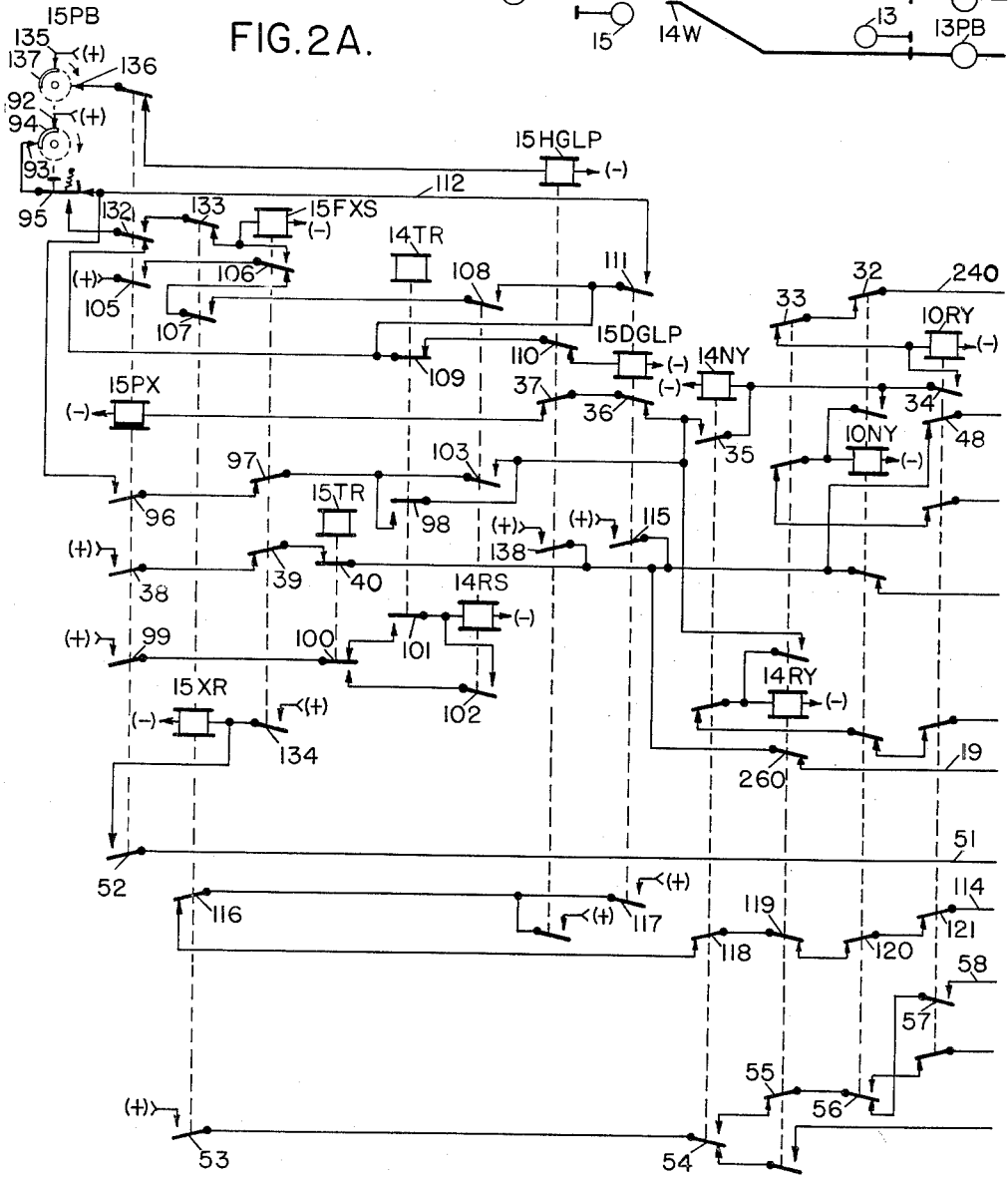

In describing this invention in detail, reference will be made to the accompanying drawings wherein:

FIG. 1 illustrates a typical track layout to which the switch and signal control system of this invention may be applied;

FIGS. 2A and 2B when placed side-by-side illustrate the circuits of one form of this invention as applied to the typical track layout of FIG. 1;

FIG. 3 illustrates diagrammatically the circuit means provided for the control of the signal control relays; and FIG. 4 illustrates the circuits for the control of the switch machines.

The various parts and circuits in the drawings have been shown diagrammatically and certain conventional illustrations have been used to simplify the illustration and facilitate in the explanation. The drawings are made more for the purpose of facilitating the disclosure as to the principles involved in the mode of operation rather than to illustrate the specific construction and arrangement of parts that might be used in practice. Thus, the various relays and their contacts and control buttons are illustrated in a conventional manner. The symbols (+) and (—) are used to indicate the positive and negative terminals, respectively, of a source of suitable low voltage used to energize the various relays and other devices.

FIG. 1 shows a typical track layout wherein a single track provides access over two track switches 10W and 14W to any one of three branching tracks. Movement of trains through the network of tracks shown is governed by wayside signals 9, 11, 13, and 15. The signals 9, 11, and 13 govern the movements of westbound trains, while signal 15 similarly governs the movement of eastbound trains. On the operator's miniature track panel there appears a diagrammatic representation corresponding to that of FIG. 1, but ordinarily the signals are not shown. Instead, a pushbutton appears at each entrance or exit point, and each of these pushbuttons has a central portion which may be distinctively illuminated to indicate that the corresponding signal has cleared so as to permit the movement of the train.

To illustrate more clearly the mode of operation that the present invention makes possible, it may be said that the prior art entrance-exit control systems ordinarily provide for straight-through moves from an entrance point to an exit point such as would be provided for a westbound train, for example, in FIG. 1 in passing from the signal 9 location to a point west of the signal 15 location. The system of this invention, of course, permits such moves to be made, but it also permits a route to be established, for example, from the signal 9 location to the signal 13 location via the signal 15 location. In other words, a train in approach of the signal 9 location can move in a westward direction over switches 10W and 14W to a point which is westward of the signal 15 location. Having thus made use of the first portion or segment of the route set up, the second portion of the route will then be automatically set up to permit the train to reverse its direction of movement and now pass over switch 14W in reverse position to a point eastward of the signal 13 location. This entire operation, involving a switch-back movement with respect to the switch 14W, can be accomplished simply by first depressing the pushbutton 9PB (see FIGS. 2A and 2B) to indicate that this is the desired entrance point for the route and following this by depressing the pushbutton 13PB to indicate that this is the desired exit point. If this route is available, the first portion thereof is immediately lined up by operating switch 10W to the reverse position and switch 14W to the normal position. When both these switches have been thus operated and locked, the signal 9 will clear to indicate that the train may now proceed in a westerly direction. When the train has proceeded westerly to a point where it vacates track section 14T and is thus in advance of signal 15, the second portion of the route is automatically lined up. This involves an operation of the switch 14W from the normal position which it had for the first portion of the route, to a reverse position and also properly aligns the various other switches to permit the train to proceed, upon the clearing of signal 15, to a point which is east of the signal 13 location.

FIG. 1 also illustrates the various track circuits which may be employed to indicate the position or location of the train. Thus, a track circuit 14T is provided which comprises all of the track between the signal 15 location and the various westbound governing signals 9, 11, and 13. There is in addition a track circuit 15T which extends for some distance to the west of the signal 15 location. Track circuit 14T has the function, of course, of indicating that there is a train present within the switching area and thus prevents operation of any of the switches in this area at such time. Occupancy of the track circuit 15T with track circuit 14T becoming unoccupied after having been occupied indicates, when a switch-back move is being made, that the first portion of the route set up for such a move has been made and that the second portion can then be established. FIGS. 2A and 2B illustrate the conventional track relays 14TR and 15TR which are associated with these two track circuits. Both these relays are normally energized when their respective track circuits are unoccupied as is the customary practice.

Each of the various pushbuttons such as the bushbutton 9PB of FIG. 2B may be operated in any of several ways depending upon the control desired. As diagrammatically illustrated, each pushbutton may be depressed from its normal position. Each pushbutton is spring biased so as to be restored, however, to the normal position shown. Thus, with respect to the pushbutton 9PB, this pushbutton in its normal position results in a front contact 20 being normally closed. When the pushbutton is depressed, the back contact 20 is closed. The diagrammatic representation of this contact 20 indicates that it is a make-before-break contact in that the back control will close before the front contact opens and vice-versa. Each pushbutton may also be rotated in the direction shown by the accompanying arrow. Thus, the pushbutton 9PB may be rotated counterclockwise and, when this is done, the switch segment 21 is then operated to a position where it no longer connects the contact points 22 and 23. At the same time, however, the switch segment 24 will then be operated to the position where it does bridge the stationary contact points 25 and 26.

Each button may also be pulled, and when this is done the normally closed front contact 20 is opened. This function provides means for the cancellation of any previously designated control as will later be described.

Before describing in detail the operation of the circuits of FIGS. 2A and 2B, it is believed expedient to point out the functions of some of the relays illustrated. Thus, there are two relays particularly associated with each pushbutton such as the relays 9DGLP and 9HGLP associated with pushbutton 9PB. When it is desired to establish an end-to-end route with the signal 9 location as the entrance point, the relay 9DGLP is picked up as result of pushing the pushbutton 9PB. On the other hand, if it is desired to set up a point-to-point route with the signal 9 location as the entrance point, the pushbutton 9PB may be rotated counterclockwise and then the relay 9HGLP will be picked up. In this connection, an end-to-end route means one which is established throughout the entire interlocked area such as from the signal 9 to signal 13 locations as contrasted with a point-to-point route which sets the switches and signals only for movement from one signal location to a successive signal location as, for example, from the signal 9 location to the signal 15 location.

There are, in addition, two switch position selecting relays associated with each track switch such as the relays 10RY and 10NY, for example, associated with the switch 10W. When a particular initiation network is established which calls for a trailing move over any particular switch, one or the other of the switch position selecting relays associated with that switch is picked up in accordance with whether the switch is to be trailed in the reverse or normal position. As an example, if the pushbutton 9PB is depressed to indicate an entrance point for a route, it is obvious that any route having this entrance point requires that a switch 10W be trailed in the reverse position. Similarly, if push button 13PB is depressed the switch 14W will be trailed in the reverse position in making such a move. Accordingly, upon the actuation of the pushbutton 9PB, the relays 10RY (switch 10W reverse) and 14NY (switch 14W normal) are both energized. The completion network that is subsequently established then selects, in accordance with the energized conditions of these relays 10RY and 14NY, that switches 10W and 14W will be operated to reverse and normal positions respectively.

For each entrance or exit point there is a PX relay as typified by relay 13PX which is associated with the signal 13 location, for example. When any signal location has been designated as a desired entrance point for a route by pushing the corresponding pushbutton, all of the permissible exit points available from that designated entrance point have their PX relays energized. In a manner known in the art, the picking up of these relays may be made effective to cause a lamp within the pushbutton associated with such exit points to flash intermittently so that the operator receives visual indication of all of the available exit points once he has designated an entrance point for a route. Another function of each PX relay is to render the associated signal location unavailable for designation as an entrance point for the setting up of another route. In addition, each PX relay when energized conditions its associated exit relay, XR, so that actuation of the corresponding pushbutton will be effective to energize the exit relay associated with that pushbutton and thereby designate that signal location as the desired exit point for the route.

At the signal 15 location which is the common or junction terminal of a plurality of route segments extending from the signals 9, 11, and 13 locations, there is also both a 15PX relay and a 15XR relay, and their functions are similar to that described above. In addition, however, both of these relays are energized for a time when an end-to-end route is designated as from the signal 9 to the signal 13 location. The picking up of these relays for such a route has the effect of temporarily establishing the signal 15 location as an exit point, whereby the first segment of the route is set up from the signal 9 location to the signal 13 location. When the train has traversed this first route segment, both these relays drop away, and the entrance relay 15DGLP is then picked up to thereby designate the signal 15 location as the entrance point for the second route segment having the previously designated signal 13 location as the corresponding exit point. However, when a point-to-point rather than an end-to-end route is designated with the signal 15 location as the desired exit point, a relay 15FXS is also energized, and this prevents the subsequent setting up of the second route segment. It does this by preventing the entrance relay 15DGLP from picking up when the train has traversed the route segment extending from the entrance point to the signal 15 location.

In addition to the various relays whose function has been generally described, there is a route stick relay 14RS whose purpose will become clear from the description that follows, and there are also the usual switch control relays such as relays 10R, 10N, 14R and 14N.

It is believed that the detailed circuits of FIGS. 2A and 2B can best be understood by describing both the manner in which an end-to-end route is established and also a point-to-point route. Considering first an end-to-end route, it will be assumed that there is a train in approach of the signal 9 location and that it is desired to set up a route for this train from this entrance point to an exit point selected as the signal 13 location. To designate the signal 9 location as an entrance point, the operator depresses the pushbutton 9PB. As a result of this operation, the normally closed front contact 20 is opened and the corresponding back contact is closed. By reason of this, energization is provided for the winding of relay 9DGLP. This energization is provided through the circuit extending from (+), through fixed contact 22, rotary contact 21, fixed contact 23, back contact 20, back contact 27 of relay 9PX, front contact 28 of the normally energized track relay 14TR, back contact 29 of relay 9HGLP, and the winding of relay 9DGLP, to the (—) terminal. As soon as this relay picks up, its front contact 30 closes so that, upon release of the pushbutton 9PB and the closure of front contact 20, a stick circuit will be provided through front contact 30 to maintain relay 9DGLP in an energized condition. The make-before-break characteristic of contact 20 insures that the stick circuit will be closed before the pick-up circuit is opened.

For any route that is to be set up from the signal 9 location to the signal 15 location, it is required that switch 10W must be operated to the reverse position and switch 14W to the normal position. Accordingly, the picking up of relay 9DGLP is effective through its front contact 31 to provide energy from the (+) terminal, over wire 240 through back contact 32 of relay 10NY, back contact 33 of relay 14RY, and through the winding of relay 10RY, to the (—) terminal so as to pick up this relay. The picking up of relay 10RY, in turn, causes the energy available at the left-hand terminal of the winding of this relay to be applied through front contact 34 of relay 10RY, and through the winding of relay 14NY, to the (—) terminal so that this relay 14NY will also be picked up. Immediately upon the picking up of relay 14NY, the energy available at the right-hand terminal of this relay winding is applied through front contact 35 of this relay, through back contact 36 of relay 15DGLP, back contact 37 of relay 15HGLP, and through the winding of relay 15PX, to the (—) terminal so as to cause the picking up of relay 15PX.

As previously stated, the picking up of relay 15PX is indicative of the selection of the signal 15 location as an exit point, either as the termination of a point-to-point route or as an interim exit point for a switch-back route which will terminate at some other exit point such as at the signal 11 or at the signal 13 location, for example.

When relay 15PX picks up, energy is applied from (+), through front contact 38 of relay 15PX, back contact 39 of relay 15FXS, front contact 40 of the normally energized track relay 15TR, back contact 260 of relay 14RY, wire 19, back contact 41 of relay 9HGLP, back contact 42 of relay 11HGLP, back contact 43 of relay 13DGLP, back contact 44 of relay 13HGLP, back contact 45 of relay 9XR, back contact 46 of relay 11XR, and through the winding of relay 13PX to the (—) terminal. When relay 13PX picks up, its front contact 47 closes to provide a stick circuit for this relay. Relay 13PX cannot be picked up if either of the relays 13DGLP or 13HGLP has been picked up because of the open back contacts 43 or 44, respectively. This means that the signal 13 location cannot be designated as an exit point if it has already been designated as an entrance point for a route. In addition, the picking up of one of the exit relays 9XR or 11XR makes it impossible for relay 13PX to be picked up because of the open back contacts 45 or 46. This means that, once one of the signal locations 9, 11 or 13 has been designated as the exit point for a route, none of the other PX relays associated with the remaining signal locations can possibly be energized to indicate them as permissible exit points.

Although only the pickup circuit for relay 13PX has been described in detail, it will be evident from the circuits associated with relay 11PX that this relay will also be energized at this time by a similar circuit and thus the relay 11XR could be picked up for the establishment of a switch-back route to signal 11. On the other hand, since relay 10RY has been picked up in the manner previously described as a result of the energization of relay 9DGLP, the back contact 48 of this relay 10RY is now open so that the corresponding circuit for relay 9PX is open at this back contact 48. This also prevents the picking up of relay 9PX, thereby designating this as a permissible exit point when the signal 9 location has already been designated as the desired entrance point by depressing the pushbutton 9PB so as to energize relay 9DGLP.

Although the circuit for the particular exit relay 13XR is not shown in detail in FIG. 2B, it corresponds exactly with that shown for relay 9XR. Thus, if relay 9PX were picked up, the actuation of the pushbutton 9PB would supply energy through the closed back contact 20, through front contact 27 of relay 9PX, and through the winding of relay 9XR, to the (—) terminal. The picking up of relay 9XR would cause a stick circuit to be immediately established through front contact 165 of relay 9PX and front contact 49 of relay 9XR. Thus, it will be obvious that the actuation of the pushbutton 13PB after relay 13PX has been picked up in the manner described above, will result in the energization of relay 13XR, and that this relay will remain energized through the stick circuit provided for it when the pushbutton is released.

With relay 13XR picked up, the energy from (+) is now applied through front contact 50 of this relay, over wire 51, through front contact 52 of relay 15PX which is now picked up as previously described, and through the winding of relay 15XR, to the (—) terminal. Thus, the relay 15XR is now picked up to indicate that the signal 15 location has been designated as an intermediate exit point to permit setting up the first route segment.

It is now possible to establish a completion network which will selectively control the various switch control relays so that they may be operated to the positions required to permit a train movement from the signal 9 location to the now-designated intermediate exit location, which is the signal 15 location. As will be seen, these switch control relays are selectively energized in accordance with the conditions of the various Y-relays, 10RY, 10NY, 14RY and 14NY. It will be recalled that these Y-relays are selectively energized in accordance with the particular entrance point that has been designated and that the relays 10RY and 14NY were immediately picked up upon the selection of the signal 9 location as the desired entrance point for the route. Accordingly, the picking up of relay 15XR now supplies energy from (+), through front contact 53 of relay 15XR, front contact 54 of relay 14NY, back contact 55 of relay 14RY, back contact 56 of relay 10NY, front contact 57 of relay 10RY, wire 58, front contact 59 of relay 9DGLP, back contact 60 of relay 9XR, back contact 61 of relay 10N, and the lower winding of relay 10R, to the (—) terminal. As soon as relay 10R picks up, a circuit is completed through its front contact 62 which then provides energy through back contact 63 of relay 14R, and through the lower winding of relay 14N, to the (—) terminal. The completion circuit is therefore effective to pick up both relays 10R and 14N with the result that switch 10W will be operated to the reverse position and switch 14W to the normal position in a manner subsequently to be described, thereby permitting train movement from the signal 9 location to the signal 15 location.

FIG. 4 shows the manner in which the signal control relays are effective to operate the switch machines to the called for positions. Thus, with relay 10R in a picked up condition while relay 10N remains dropped away, it is clear that the (+) terminal of the energy source is connected through back contact 64 of relay 10N and front contact 65 of relay 10R, to the wire 66. At the same time, the (—) terminal of the same energy source is connected through back contact 67 of relay 10N and front contact 68 of relay 10R to the other wire 69. This polarity of the energization applied to wires 66 and 69 results in the operation of the 10W switch machine to the reverse position. If instead the relay 10N were picked up and the relay 10R dropped away, the polarity of the energization applied to wires 66 and 69 would be opposite from that described above and the switch machine 10W would then be operated in the normal position. From this description, it will similarly be evident that with relay 14N picked up as described above, the wire 70 will be connected to the (+) terminal while the wire 71 will be connected to the (—) terminal so that the associated switch machine 14W will be operated to the normal position.

FIG. 3 illustrates the circuits provided for the control of the various signals shown in FIG. 1. Among the various relays diagrammatically illustrated there are included the various switch correspondence relays such as the relay 10NCR. Each such relay is normally dropped away but is picked up when the associated switch has had its switch points operated to the called-for position. Thus, when relay 10N is picked up, this requires that the switch 10W be operated to the normal position in accordance with the description given above. When the switch points have actually been operated to the normal position, the switch correspondence relay 10NCR which is associated with the normal position of switch machine 10W will be picked up. When the called-for position of the switch machine is different from the actual operated position of the switch points, the relay 10NCR is dropped away. For the assumed set of conditions relay 10RCR must become picked up and also the relay 14NCR must become picked up to indicate that the switches have both been operated to the required positions in view of the fact that the signal 9 location has been selected as the entrance point for the route. FIG. 3 also illustrates a slow drop-away lock stick relay 14LS, and this relay is controlled in a manner well-known in the art wherein it is dropped when the switches for a route have been operated into correspondence, and is maintained deenergized while the route and detector locking is effective. Essentially, this relay is normally energized, but is dropped away whenever all of the related track switches such as the switches 10W and 14W in FIG. 1 have been operated into correspondence with their called for positions.

Assuming that the switches are lined up in the manner required to line up the first route portion from the signal 9 location to the signal 15 location, and that the switch points of the switches are in correspondence with their required positions, a circuit will then be completed from (+) and extending through back contact 75 of relay 15 HGLP, back contact 76 of relay 15 DGLP, front contact 77 of relay 14TR, back contact 78 of relay 14LS, front contact 79 of relay 14NCR, back contact 80 of relay 14RCR, back contact 81 of relay 10NCR, front contact 82 of relay 10RCR, front contact 83 of relay 9DGLP, and through the winding of the signal control relay 9G, to the (−) terminal. This energization of relay 9G has the effect of connecting the (+) terminal through front contact 84 of relay 9G to the wire 85 and at the same time connecting the (−) terminal through front contact 86 to the wire 87. Such energization of the wires 85 and 87 energizes the signal 9 mechanism in such a way that a proceed indication is given. Whenever the relay 9G is dropped away, the wires 85 and 87 are disconnected from the source of energy and are instead then shunted together through the back contact 84 of relay 9G. Under these circumstances, the signal 9 mechanism is conditioned to display a stop indication.

When the train in advance of the signal 9 location thus receives the proceed indication from signal 9, it may then advance beyond this location. As soon as it does, it shunts the track circuit 14T with the result that the associated track relay 14TR is dropped away. Referring to FIG. 4 it is shown there that this dropping away of relay 14TR causes the back contact 88 of this relay to close so as to provide stick circuit energization for the then energized switch control relay 10N or 10R as the case may be. A similar stick circuit is also provided through back contact 89 of this relay to provide stick circuit energization for one or the other of the switch control relays 14N or 14R. For the assumed conditions involving a train movement from the signal 9 location, the switch 10W is operated to the reverse position while the switch 14W is in the normal position. From the description given above, it is evident that in order for the signal 9 to have cleared in order to make this move possible, the switch correspondence relays 10RCR and 14NCR will both be picked up to indicate that the associated switches have been actually operated to the called for positions. Thus, a circuit will then be completed from (+), through back contact 88 of track relay 14TR, front contact 90 of relay 10RCR, and through the upper winding of relay 10R, to (−). A similar circuit is provided from (+), through back contact 89 of track relay 14TR, front contact 91 of relay 14NCR, and through the upper winding of relay 14N to the (−) terminal. As a result, throughout the time that a train is occupying the track section 14T, the upper windings of the relays 10R and 14N will be energized and these relays will thus remain picked up irrespective of the circuit condition with respect to their lower windings as previously described. As a result, it is assured that the switches involved will remain in the conditions to which they were operated at the time the train accepted the clear indication of signal 9.

Another result of the dropping away of track relay 14TR is the opening of the stick circuit of relay 9DGLP at the now open front contact 28. As soon as relay 9DGLP drops away, its front contact 31 opens so as to deenergize relay 10RY. Similarly, the dropping away of relay 10RY opens its front contact 34 to release relay 14NY. Although the dropping away of relay 14NY will now open, at its front contact 35, the pickup circuit previously established for relay 15PX, this relay will remain energized because of the stick circuit which is now established for it. This stick circuit extends from (+) and includes the fixed contacts 92 and 93 which are bridged by the rotary segment 94 of pushbutton 15PB, normally closed contact 95 of pushbutton 15PB, front contact 96 of relay 15PX, back contact 97 of relay 15FXS, back contact 98 of track relay 14TR, back contact 36 of relay 15DGLP, back contact 37 of relay 15HGLP, and through the winding of relay 15PX, to (−). Thus, this stick circuit maintains relay 15PX energized throughout the time that the train occupies the track section 14T.

Another result of the dropping away of the track relay 14TR is the picking up of the route stick relay 14RS. This relay is energized through a circuit extending from (+) and including front contact 99 of relay 15PX, front contact 100 of track relay 15TR, back contact 101 of track relay 14TR, and through the winding of relay 14RS, to the (−) terminals. The function of this route stick relay will subsequently be described in detail.

As the train proceeds further into track section 14T, it finally enters track section 15T in approach of signal 15 so that the track relay 15TR is dropped away. When this occurs, an obvious stick circuit is provided for the route stick relay 14RS through back contact 100 of relay 15TR and the now closed front contact 102 of relay 14RS. This assures that relay 14RS will remain picked up when the train has moved fully into track section 15T and vacated track section 14T although, at this time, back contact 101 of track relay 14TR will open and thus interrupt the previously described pickup circuit for relay 14RS. As a result of this picked-up condition of relay 14RS, an alternate stick circuit is provided for relay 15PX through the now closed front contact 103 of relay 14RS which shunts the contact 98 of relay 14TR and thus provides continuity for this stick circuit of relay 15PX before track section 14T becomes unoccupied and relay 14TR again picks up.

When the train has progressed further to the point where track section 14T is vacated, a pickup circuit is completed for relay 15DGLP. The picking up of this relay has the function, as will presently be described, of designating the signal 15 location as, in effect, the entrance point for the switch-back movement which will take the train over switch 14W in the reverse position to the signal 13 location. This pickup circuit for relay 15DGLP includes (+) at front contact 105 of relay 15PX, back contact 106 of relay 15FXS, front contact 107 of relay 15XR, front contact 108 of relay 14RS, front contact 109 of relay 14TR, back contact 110 of relay 15HGLP, and through the winding of relay 15DGLP, to (−).

The picking up of this relay 15DGLP opens its back contact 36 so as to open the stick circuit for relay 15PX previously described. The dropping away of relay 15PX opens front contact 105 of this relay so as to open the pick-up circuit for relay 15DGLP. However, previous to this, the picking up of relay 15DGLP has caused a stick circuit to be provided for this relay through its front contact 111. The energy for this stick circuit is provided through the previously described contacts 92, 93, and 94 of the push button 15PB and over wire 112, front contact 111, contact 109 of track relay 14TR, and back contact 110 of relay 15HGLP. Another effect of the dropping away of relay 15PX is that its front contact 99 opens, thereby permitting the route stick relay 14RS to drop away. This relay 14RS has now performed its function of providing a pickup circuit for the relay 15DGLP whereby the signal 15 location has been designated as the entrance point for the switch-back move.

It should be noted that relay 15DGLP can only be picked up provided that the relays 14TR and 14RS are picked up. Relay 14RS, on the other hand, can only be picked up when track relay 14TR is dropped away. Thus, for a switch back move, the train must have moved through track section 14T into track section 15T before relay 15DGLP can pick up. This guards against the possibility that the second train approaching the signal 15 location and inadvertently running into track section 15T will cause the picking up of relay 15DGLP.

Another effect of the dropping away of relay 15PX is that the front contact 38 of this relay opens, thereby interrupting the previously described circuit for relay 13PX. However, the prior picking up of relay 15DGLP has caused front contact 115 of this relay to close, thereby providing an alternate source of energization for relay 13PX.

In addition, the dropping away of relay 15PX opens its front contact 52 so as to deenergize relay 15XR. Consequently, front contact 53 of this relay opens and thereby interrupts the completion network, previously described, which was effective to select the switch positions for the first portion of the route. At this time, back contact 116 of relay 15XR closes and permits the second completion network to be established which selects the switch conditions for the switch-back move as, for example, from the signal 15 location to the signal 13 location. Under the assumed conditions, the completion network will supply energy from the (+) terminal, through front contact 117 of relay 15DGLP, back contact 116 of relay 15XR, back contact 118 of relay 14NY, back contact 119 of relay 14RY, back contact 120 of relay 10NY, back contact 121 of relay 10RY, wire 114, front contact 122 of relay 13XR, back contact 123 of relay 14N, through the lower winding of relay 14R, to (−). The switch control relay 14R is picked up so that, as shown in FIG. 4, the switch machine 14W will be operated to the reverse position and thus permit train movement from the signal 15 to the signal 13 location.

When switch 14W has operated to the reverse position as called for by the picked up condition of relay 14R, the circuit is completed to energize the signal control relay 15G so that this signal will give a proceed indication to the train in approach thereof and thus permit the train to make the switch back move to the signal 13 location. As shown in FIG. 3, this circuit extends from (+) and includes back contact 124 of relay 13HGLP, back contact 125 of relay 13DGLP, front contact 126 of relay 14RCR, back contact 79 of relay 14NCR, back contact 78 of relay 14LS, front contact 77 of relay 14TR, front contact 76 of relay 15DGLP, and through the winding of relay 15G (−). The resultant picking up of relay 15G results in the energization of the wires 127 and 128 so that the signal 15 mechanism is caused to display a proceed indication.

When the train accepts the proceed indication of signal 15 and enters the track section 14T, the track relay 14TR drops away and this results in the deenergization of relay 15DGLP at the now open front contact 109 of track 14TR. Front contact 115 of relay 15DGLP then opens so that the energization for relay 13PX is removed. The stick circuit for this relay which has been effective through its front contact 129 and through front contact 130 of relay 15XR has been previously opened by the dropping away of relay 15XR. Thus relay 13PX drops away and this permits the release of relay 13XR since, as previously described, the relay 13XR is held energized dependent upon the picked up condition of relay 13PX.

When the train has proceeded still further to the point where it vacates track section 14T, the track relay 14TR is restored to its normal picked up condition. The stick circuit shown in FIG. 4 as having been effective through back contact 89 of track relay 14TR to hold the switch control relay 14R energized will then be interrupted so that this relay will also drop away. Thus, all of the various relays are now restored to their normal conditions, so that a subsequent route can be set up for another train movement.

To illustrate further the operation of the circuits of FIGS. 2A and 2B, consideration will be given now to the manner in which only a point-to-point route may be set up as, for example, from the signal 9 location to a signal 15 location. It will be remembered from the description previously given that only a point-to-point route can be established if entrance is designated by rotation of the entrance pushbutton rather than depressing it. Thus, if the entrance pushbutton 9PB is rotated counterclockwise, the rotatable segment 24 will bridge the fixed contacts 25 and 26 so that a circuit will be completed which will supply energy to the back contact 166 of relay 9PX, and through the winding of relay 9HGLP, to (−). When this relay picks up, a circuit is completed through its front contact 131 which will be effective, in the same way that the closure of front contact 31 was upon the picking up of relay 9DGLP, to pick up in succession the relays 10RY, 14NY and 15PX. With relay 15PX picked up, a circuit is then completed from (+), through the contacts 92—94 of the entrance push button 15PB and through back contact 95, when the push button 15PB is depressed to indicate that this is the desired exit point, and then through front contact 132 of relay 15PX and back contact 133 of relay 15XR, to energize the winding of relay 15FXS. When relay 15FXS, picks up, its front contact 134 closes to energize relay 15XR. With relay 15XR picked up, the same completion network is completed as was previously described through the front contact 53 of relay 15XR to selectively energize the switch control relays 10R and 14N. This causes the switch machines 10W and 14W to be operated, respectively, to reverse and normal positions. When the switches have both been operated through the called-for positions, the signal 9 will be cleared in the manner previously described in connection with FIG. 3.

When the train accepts the cleared signal 9 and enters into track section 14T, relay 14RS picks up in the same manner as described previously for an end-to-end movement. Under these circumstances, however, the picking up of relay 14RS cannot be effective to close a pickup circuit for relay 15DGLP. Thus, even though track relay 14TR is picked up and closes its front contact 109 when the train has passed out of track section 14T and occupies track section 15T, the pickup circuit for relay 15DGLP will remain open at the open back contact 106 of relay 15FXS. Thus, it can be seen that the relay 15FXS is effective to distinguish between an end-to-end and a point-to-point route. Thus, by holding the pickup circuit for relay 15DGLP open, relay 15FXS prevents the signal 15 location from being subsequently designated as an entrance point for a switch-back move to one of the other signal locations such as the signal 11 or signal 13 locations.

It should be noted that a point-to-point route set up in the manner described above, is maintained until the entrance pushbutton, by means of which the route was initially established, is rotated back to its original position. Thus, for the assumed conditions, the relays 9HGLP, 10RY, 14NY, 15PX, 15FXS and 15XR will all remain energized and will not be restored to their normal dropped away conditions until pushbutton 9PB is rotated clockwise to the normal position shown in FIG. 2B.

Consideration will now be given to the operation of the circuits of FIGS. 2A and 2B for the setting up of a point-to-point route with the signal 15 location as the entrance point and the signal 13 location as the exit point. Designation of the signal 15 location as the entrance point for a point-to-point route may be accomplished by rotating the pushbutton 15PB clockwise so that energy is applied through the fixed contacts 135 and 136 of pushbutton 15PB now bridged by rotary contact 137, and through the winding of relay 15HGLP, to (−). The picking up of this relay causes energy to be applied through its front contact 138 to each of the various PX relays 9PX, 11PX, and 13PX. Each of these PX relays is energized by circuits similar to the one described previously with respect to relay 13PX. If the pushbutton 13PB is then depressed to designate that signal location as the desired exit point, the associated exit relay 13XR will be energized in a manner already described and will remain energized after the pushbutton is released by reason of the stick circuit which is completed for such relay through its own front contact (not shown, but see relay 9XR). Under the present circumstances, a circuit will not be provided to pick up relay 15XR because of the open front contact 52 of relay 15PX, this latter relay being held deenergized by reason of the open back contact 37 of relay 15HGLP.

It should be noted also that the picking up of relay 13XR results in the opening of back contacts 140 and 141 of this relay so that the relays 9PX and 11PX are immediately dropped away. This prevents either of the exit relays 9XR or 11XR from being inadvertently picked up to also designate these associated signal locations as possible exit points once the signal 13 location has been designated as the desired exit point.

With relay 15XR dropped away, and relay 15HGLP now picked up, a completion network is provided identical to that previously described, which results in the energization of the switch control relay 14R. It will be obvious from the description given that the picking up of this relay will result in the operation of switch 14W to the reverse position so as to permit the train movement to be made from the signal 15 location to the signal 13 location.

As has been mentioned, each of the pushbuttons may also be pulled, and when this is done the normally closed pushbutton contact associated with each control circuit is opened. Thus, under the circumstances described previously where the signal 9 location has been designated as the desired entrance point by depressing pushbutton 9PB, this has resulted in the picking up of relay 9DGLP. If the operator then decides that he wishes to cancel this move and designate some other signal location as an entrance point, he is only required to pull the pushbutton 9PB. This has the effect of opening the normally closed front contact 20 so that the stick circuit for relay 9DGLP is opened, thereby permitting this relay to drop away.

Test key operation for the various switches is also provided in the manner shown in FIG. 4. To provide this, there is shown a three-position manually operable switch for each track switch. Thus, as shown in FIG. 4, there is a test key 155 associated with switch 10W which is normally biased to a neutral position but may be operated selectively to either a reverse or normal position to thereby operate the track switch 10W respectively to the reverse and normal positions. This operation is advantageous when it is desired to test a switch machine to see that it is operating properly or to free it from obstructions.

If neither of the switch control relays 10N or 10R is energized, operation of the switch contact 155 to the right-hand or reverse position causes a circuit to be completed through back contact 156 of relay 10N and through the upper winding of relay 10R. The resultant picking up of relay 10R will cause the switch machine 10W to be operated to the reverse position. In a similar manner, if neither relay were picked up, operation of this switch contact 155 to the left-hand position would complete a circuit through back contact 157 of relay 10R to the upper winding of the switch control relay 10N. This energization of relay 10N will then cause switch 10W to be operated to the normal position. If either relay 10N or 10R is energized for the setting up of a desired route, operation of the test key will have no effect. For example, if the relay 10R were energized for operation of switch 10W to the reverse position, operation of the contact 155 to its left-hand or "normal" position would merely cause energy to be applied through front contact 157 to the upper winding of relay 10R. The effect would thus be the same as if the contact 155 were operated to the right-hand position. This circuit arrangement guards against inadvertent operation of the track switches in the event that a route has been lined up for a train movement.

Having described one form of the present invention as applied to a relatively simple track layout, it is to be understood that the invention is applicable to other and more complex track layouts as may be required in practice and that various adaptations, alterations and modifications may be applied to the embodiments herein disclosed within the scope of the impending claims without departing from the spirit and scope of my invention.

What I claim is:

1. In a switch control system for a railway track layout comprising a plurality of power operated switch machines, first and second route terminal points being interconnected by a route through said track layout via at least one switch with said route requiring a train to traverse one of the track switches in one position and reverse its direction to traverse that track switch in its opposite position, means for designating the first and second route terminal points, circuit means effective in response to the designation of said first and second terminal points respectively for initially aligning a first portion of said route from said first route terminal point over said one switch in one of its operated positions, means effective in response to a train having passed over said one switch to align a second portion of said route for said train over said one switch in the opposite of its positions to said designated second route terminal point.

2. A switch and signal control system for a railway track layout including a plurality of track switches and signals governing the entrance of trains to each route segment comprising the portion of track between two of said signals, and also including at least one track switch, distinctively operable contact means associated with each signal location, first and second signals governing the entrance of trains into first and second route segments converging over one of said switches in its respective normal and reverse positions into a signal location at a common junction point, route establishing means responsive to the successive and in order actuations of said contact means for said first and second signal locations respectively to set up an end-to-end route sequentially from said first signal location to said second signal location, said route establishing means being effective to establish first a route over said first route segment, means for detecting when a train has traversed said one switch in the position required to permit train movement over said first route segment, said route establishing means being also effective in response to a control from said detecting means for subsequently setting up a route over said second route segment with said one switch operated to its opposite position, and signal control means successively clearing said signals governing entrance to said first and second route segments respectively as the routes through said segments are aligned.

3. A system for controlling the switches in a railway track layout including a plurality of route segments each including at least one track switch and with each having respective entrance and exit terminal points, circuit means for sequentially establishing a route between the entrance point of a first route segment and the exit point of a second route segment wherein the exit point of the first route segment and the entrance point of the second route segment are adjoining and the route segments include the normal and reverse positions respectively of one of said track switches, said circuit means first setting up a route portion by aligning the switches in the first segment extending from its entrance point to its exit point and being effective to operate said one switch to one of its positions, detector means for detecting when said one switch has been traversed by said train, said circuit means being governed by said detector means to align the switches in the second segment including said one switch in its opposite condition to thereby permit movement of said train in the opposite direction through said second segment.

4. The system according to claim 3 wherein said detector means includes a track circuit.

5. The system according to claim 3 wherein said detector means comprises, a first track circuit coextensive with said plurality of route segments, a second track circuit adjoining the first and in advance of said adjoining ends of the segments, and relay circuit means being responsive to the successive and in order shunting of said first and second track circuits by a train for governing said circuit means to align the switches in said second route segment.

6. A switch and signal control system for a track layout comprising a plurality of track switches for setting up different routes through said track layout and also signals located to govern traffic over such routes, selectively operable contact means for each of said signal locations, said track layout including first and second signals at locations for governing entrance to first and second routes extending through the normal and reverse trailing points respectively of one of said track switches, and said track layout having a junction signal at a location for governing the facing point movement of trains over said one switch in its respective normal and reverse positions to said first and second signal locations, route establishing means responsive to the successive and in order actuations of said contact means associated with said first and second signal locations respectively to set up first a route portion from said first signal location, means responsive to the passage of a train over said one track switch in one of its operated positions from said first signal location to said junction signal location and clear of said one track switch, circuit means responsive jointly to said last two named means for subsequently causing said route establishing means to set up a route position from said junction signal location to said second signal location over said one track switch in its opposite condition, and signal control means for clearing the signal at said first signal location when said first route portion is set up and subsequently clearing said signal at said junction signal location when said second route portion is set up.

7. The system according to claim 6 further including means responsive to the successive and in order actuations of said contact means associated respectively with said first and junction signal locations for rendering said circuit means unresponsive, whereby said route portion from said junction signal location to said second signal location is prevented from being set up.

8. In a railway switch control system of the entrance-exit type for a multi-track layout including a plurality of switches and a plurality of route terminals, first and second route terminals denoting the ends of respective route segments converging over one of said track switches in its respective reverse and normal positions into a single stretch of track having an associated junction terminal, first means associated with said first route terminal, first route selection means for distinctively operating said first means to thereby designate said first route terminal as the entrance point for a route between said first and second route terminals, second means associated with said second route terminal, second route selection means for distinctively operating said second means to thereby designate said second route terminal as the exit point for said route, means responsive to said first and second means to align a first segment of said route between said entrance terminal and said junction terminal over said one switch in one of its positions, detector means for detecting the passage of a train from said entrance terminal to said junction terminal, means responsive jointly to said first and second means and said detector means subsequently to align the second segment of said route from said junction terminal back over said one switch in its opposite condition to said exit terminal.

9. In a switch and signal control system wherein routes may be established over a railway track layout between designated entrance and exit points by selective operation of track switches and traffic governing signals included in said track layout, means for establishing a route including at least one track switch between spaced entrance and exit signal locations, said route including the reversal of traffic through one of said track switches so as to establish a route for a train to pass through that track switch in its normal and reverse operated positions respectively in proceeding between the designated entrance and exit points, said means comprising first circuit means at a first of said spaced signal locations for designating it as the entrance point for a route, second circuit means at the other of said spaced signal locations for designating it as the exit point for said route, said first and second circuit means cooperating to operate said switches first to the positions required to permit movement of the train from said designated entrance point over said one switch in one of its respective positions, detector circuit means for detecting that said train has passed over said track switch and acting jointly with said first and second circuit means to align said track switches to permit movement of said train in a reverse direction to said second signal location over said one switch in the opposite of its positions.

10. In a system for controlling the switches in a railway track layout comprising a plurality of track segments interconnected by track switches and having route terminal points associated with the ends of said route segments, route entrance and route exit designating means associated with each of said terminal points, route establishing means for distinctively operating the route entrance designating means at a first terminal point and the route exit designating means at a second terminal point for causing said route establishing means to line up a route from said first point to said second point, said route establishing means being effective when said first point and said second point are the remote terminal points of route segments converging at a common terminal point over one of said switches in its respective normal and reverse positions to first distinctively operate said route exit designating means at said common terminal as the exit terminal point for a first route segment extending from the designated entrance point to said common terminal point, means for detecting when a train has traversed said first route segment and said one switch in one direction and in one of its operated positions, said route establishing means being governed by said detector means for distinctively operating said route entrance designating means at said common terminal to subsequently align a route from said common terminal to said designated exit point to permit said train to traverse said switch in the opposite direction and in the opposite of its operated positions.

11. In a switch and signal control system for a multi-track layout including a plurality of switches and a traffic governing signal at each route terminal, means for setting up a route between spaced first and second signal locations, said route including the reversal in the direction of traffic through one of said track switches so as to pass through that track switch in its normal and reverse positions respectively in proceeding from the first signal location to the second signal location, route entrance and route exit establishing means associated with both said first and second signal locations, means at said first signal location acting on said route entrance establishing means and means at said second signal location acting on said route exit establishing means to establish thereby said first and second signal locations as the desired entrance and exit points respectively of a route over said track layout, and circuit means distinctively responsive to said route entrance and route exit establishing means upon the designation of said route to establish a first portion of said route from said first signal location over said one track switch in one of its operated positions, and means responsive to the passage of said train from said entrance point over said one track switch to set up a second portion of said route to said exit point over said one track switch in the opposite of its positions.

References Cited in the file of this patent

UNITED STATES PATENTS

| | | |
|---|---|---|
| 2,158,975 | Benedict | May 16, 1939 |
| 2,425,109 | McCann | Aug. 5, 1947 |
| 2,851,590 | Venning et al. | Sept. 9, 1958 |
| 2,891,142 | Ihrig | June 16, 1959 |
| 2,910,578 | Karlet | Oct. 27, 1959 |